US006839373B1

United States Patent
Takehisa et al.

(10) Patent No.: US 6,839,373 B1
(45) Date of Patent: Jan. 4, 2005

(54) ULTRA-NARROW BAND FLOURINE LASER APPARATUS

(75) Inventors: Kiwamu Takehisa, Hiratsuka (JP); Hakaru Mizoguchi, Hiratsuka (JP); Shinji Nagai, Hiratsuka (JP); Tatsumi Gotou, Yamoto (JP)

(73) Assignee: Komatsu Ltd., Tokyo (JP)

( * ) Notice: Subject to any disclaimer, the term of this patent is extended or adjusted under 35 U.S.C. 154(b) by 303 days.

(21) Appl. No.: 09/608,964

(22) Filed: Jun. 30, 2000

(30) Foreign Application Priority Data

Jul. 5, 1999 (JP) .......................................... 11-190490

(51) Int. Cl.[7] .................................................. H01S 3/22
(52) U.S. Cl. .............................. 372/57; 372/58; 372/59
(58) Field of Search ............................ 372/57–59, 85, 372/86, 87

(56) References Cited

U.S. PATENT DOCUMENTS

| 4,240,043 A | * | 12/1980 | Rothe ........................... 372/83 |
| 4,829,536 A | * | 5/1989 | Kajiyama et al. .............. 372/57 |
| 4,856,018 A | * | 8/1989 | Nozue et al. .................. 372/98 |
| 4,860,300 A | * | 8/1989 | Baumler et al. ............... 372/57 |
| 4,958,356 A | * | 9/1990 | Tanuma ........................ 372/59 |
| 5,005,181 A | * | 4/1991 | Yoshioka et al. .............. 372/59 |
| 5,150,370 A | * | 9/1992 | Furuya et al. ............... 372/106 |
| 5,303,254 A | * | 4/1994 | Szatmari ....................... 372/87 |
| 5,642,372 A | * | 6/1997 | Tomita ......................... 372/45 |
| 6,151,350 A | * | 11/2000 | Komori et al. ................ 372/59 |
| 6,154,470 A | * | 11/2000 | Basting et al. ................ 372/19 |
| 6,188,710 B1 | * | 2/2001 | Besaucele et al. ............. 372/57 |
| 6,240,117 B1 | * | 5/2001 | Gong et al. ................... 372/57 |
| 6,327,290 B1 | * | 12/2001 | Govorkov et al. ........... 372/103 |
| 6,331,994 B1 | * | 12/2001 | Ohmi et al. ................. 372/100 |
| 6,345,065 B1 | * | 2/2002 | Kleinschmidt et al. ...... 372/100 |
| 6,381,257 B1 | * | 4/2002 | Ershov et al. ............... 372/108 |
| 6,421,365 B1 | * | 7/2002 | Kleinschmidt et al. ...... 372/108 |

* cited by examiner

Primary Examiner—Tom Thomas
Assistant Examiner—José R. Díaz
(74) Attorney, Agent, or Firm—Varndell & Varndell, PLLC

(57) ABSTRACT

An ultra-narrow band fluorine laser apparatus is provided in which a line width of a fluorine laser can be narrowed to about 0.2 to 0.3 pm without using any band-narrowing element such as an etalon. In an oscillator 11, a laser chamber 15 is provided in a stable type resonator constituted by an output mirror 13 and a totally reflecting mirror 14. The laser chamber 15 is filled with a laser gas at about 0.8 atm. As a result, when discharge is caused in the laser chamber 15 to cause laser oscillation, laser light L10 in a bandwidth of about 0.3 pm is provided. The power of the laser light L10 is increased by an amplifier 12. The amplifier 12 emits laser light L20 in a bandwidth of about 0.3 pm having laser energy of 10 mJ or more.

9 Claims, 4 Drawing Sheets

ULTRA-NARROW BAND FLOURINE LASER APPARATUS

BACKGROUND OF THE INVENTION

1. Field of the Invention

The present invention relates to an ultra-narrow band fluorine laser apparatus for supplying laser beams from a fluorine laser as an exposure light source of an exposure apparatus.

2. Description of the Related Art

There are various requirements for the performance of a lithographic exposure apparatus including resolution, alignment accuracy, processing capability and reliability of the apparatus. Resolution R which directly relates to fineness of a pattern is expressed by $R = k \cdot \lambda / NA$ where k represents a constant; $\lambda$ represents an exposure wavelength; and NA represents the numerical aperture of a projecting lens. Therefore, the shorter the exposure wavelength $\lambda$ is, the more preferable resolution becomes. In exposure tools according to the related art, therefore, an i-line (having a wavelength of 365 nm) from a mercury lamp or a krypton fluorine (KrF) excimer laser having a wavelength of 248 nm is used as an exposure tool light source. The machines are therefore referred to "i-line exposure tools" or "KrF exposure tools".

Exposure tools utilizing an argon fluorine (ArF) excimer laser having a wavelength of 193 nm as an exposure light source have been put in use as next generation exposure tools for fine processing. Those machines are referred to as "ArF exposure tools". An ArF exposure tool uses a narrow band ArF excimer laser in a bandwidth as small as about 0.6 pm and an achromatic lens made of two types of materials is used as a reducing projection optical system.

Further, referring to next generation lithographic exposure tools to replace the above-described ArF exposure tools, studies are in progress on fluorine exposure tools utilizing a fluorine laser having a wavelength of about 157 nm as a light source.

A fluorine laser has two oscillation beams (also referred to as "oscillation lines") with different wavelengths and optical intensities. It is said that those beams have wavelengths of 157.5233 nm and 157.6299 nm respectively and that each of the oscillation beams has a bandwidth of about 1 pm.

When such a fluorine laser is used for exposure, in general, it is considered advantageous to use only one line with a wavelength (157.6299 nm) having high intensity (hereinafter referred to as "single line configuration"), and one or two prisms have been used for such a single line configuration according to the related art.

However, since the line has a bandwidth of about 1 pm, it is considered necessary to use a catadioptric reducing projection optical system which is said to be usable in a bandwidth ten times wider than that of totally refractive optical system utilizing only lenses, as a reducing projection optical system of an exposure tool.

Operating characteristics and the like of fluorine lasers are described, for example, in "The Review of Laser Engineering, Vol. 19, No. 11, pp. 2–24" (reference 1).

Results of experiments on the one line selection are reported in, for example, "SPIE, 24th International Symposium on Microlithography, February 1999" (reference 2).

A catadioptric type system as described above necessitates a new design because it is different from refractive reducing projection optical systems formed by only lenses commonly used in conventional exposure tools (i.e., ArF exposure tools), which has resulted more problems in this type of system than in a totally refractive reducing projection optical system.

For the reasons described below, it has been difficult to provide a laser oscillation in a bandwidth as narrow as about 0.2 to 0.3 pm which is regarded usable in a totally refractive reducing projection optical systems which are more advantageous than the catadioptric type.

While a partial reflection coating must be used in an etalon or the like whose band can be narrower than that in the case where a prism is used, such a partial reflection coating may not provide sufficient light-resisting strength.

That is, in a laser with a short wavelength like a fluorine laser (i.e., a laser having a high photon energy), since a great amount of laser light is absorbed by many optical materials, even a small amount of impurity can cause damage of a partial reflection coating provided on an etalon or the like attributable to a temperature rise beyond the melting point thereof because of the absorption of laser light by the optical materials forming the coatings.

Further, while a substrate having a high surface accuracy is required for an etalon, for example, a substrate (optical material) usable in a wavelength $\lambda = 157$ nm of a fluorine laser and whose base material is calcium fluoride results in a problem in that it is difficult to achieve surface accuracy of $\lambda/100$ which is normally required for an etalon.

It is an object of the invention to provide an ultra-narrow band fluorine laser apparatus having a line width as narrow as 0.2 to 0.3 pm without using an element such as an etalon for achieving a narrow band.

SUMMARY OF THE INVENTION

In order to achieve the above-described object, according to a first aspect of the invention, there is provided an ultra-narrow band fluorine laser having a laser chamber which is filled with a laser gas including fluorine and to which a predetermined discharge voltage is applied between a cathode and an anode thereof for causing a fluorine laser to oscillate laser light to be supplied as an exposure light source of an exposure apparatus, characterized in that the pressure of the laser gas is set equal to or lower than a predetermined value such that a bandwidth of laser light oscillated by the laser chamber is narrowed to a desired value.

According to a second aspect of the invention, there is provided an apparatus according to the first aspect, characterized in that the bandwidth is narrowed to a desired value within the range from 0.2 to 0.3 pm.

According to a third aspect of the invention, there is provided an apparatus according to the first aspect, characterized in that the pressure of the laser gas is set equal to or lower than 1 atm.

According to a fourth aspect of the invention, there is provided an apparatus according to the first aspect, characterized in that the interval between the two electrodes is set at a predetermined length to maintain glow discharge without causing dielectric breakdown between the cathode and anode when the pressure of the laser gas is set equal to or lower than the predetermined value.

According to a fifth aspect of the invention, there is provided an apparatus according to the fourth aspect, characterized in that the discharging mode for causing the glow discharge is longitudinal discharge in which discharge occurs in the same direction as the optical axis of laser light oscillated in the laser chamber.

According to a sixth aspect of the invention, there is provided an apparatus according to the first aspect, characterized in that it further has an oscillator including the laser chamber and an amplifier for amplifying the power of laser light oscillated by the oscillator and supplying it as an exposure light source for the exposure apparatus.

According to a seventh aspect of the invention, there is provided an apparatus according to the sixth aspect, characterized in that the discharging mode of the glow discharge caused between the cathode and anode in the laser chamber is transverse discharge in which discharge occurs in a direction perpendicular to the optical axis of laser light oscillated in the laser chamber and in that the transverse discharge decreases the discharge voltage applied between the cathode and anode to a desired voltage such that glow discharge is maintained without causing dielectric breakdown between the two electrodes.

The first, second, third, sixth and seventh aspects of the invention will now be described with reference to FIGS. 1 through 3.

As shown in FIG. 1, in an ultra-narrow band fluorine laser apparatus 100, a laser chamber 15 is provided in a stable type resonator constituted by an output mirror 13 and a totally reflecting mirror 14, and the chamber 15 is filled with a laser gas including fluorine at about 0.8 atm. As a result, when discharge (glow discharge) is caused between electrodes in the laser chamber 15 to oscillate the laser, laser light L10 in a bandwidth of about 0.3 pm (see FIG. 2) is obtained.

The laser energy of the laser light L10 is as small as 1 mJ or less and is not usable for exposure as it is.

The energy of the laser light L10 from an oscillator 11 is increased by an amplifier 12. Specifically, the laser light L10 enters through a concave mirror 17 with a hole and is amplified as it travels in a laser chamber 18, and laser light L20 is obtained around a convex mirror 16.

Discharge is caused in a transverse excitation system in the oscillator 11. Specifically, it is a system in which discharge is caused across the optical axis of the laser light in the laser chamber 15 (in a direction perpendicular to the direction of the optical axis). In this transverse excitation system, since the interval between the cathode and anode is small (e.g., in the range from 10 to 20 mm), the discharge voltage must be low to prevent occurrence of arc discharge between the electrodes when the gas pressure is decreased. This results in a reduction of the laser power. For example, when the gas pressure is decreased from 4 atm to 1 atm, the discharge voltage must be decreased from about 20 KV to about 10 KV.

FIG. 3 is a graph showing dependence of the laser output on discharge voltages. In the laser chamber 15, a laser operation occurs within the shaded range indicated by reference number 31 in FIG. 3. As understood by referring to FIG. 3, when the gas pressure is decreased from 4 atm to 1 atm, the discharge voltage in the laser chamber must be decreased at a degree that causes no arc discharge, which also results in a reduction in the laser power.

While the laser light L20 obtained by amplifying the laser light L10 whose power has been thus reduced with the amplifier 12 has a bandwidth of about 0.3 pm because it has a spectrum similar to that of the laser light L10, the laser energy has been increased to 10 mJ or more. That is, the laser light L20 has sufficient energy to use for exposure.

As described above, in the first and second aspects of the invention, the bandwidth of an oscillation beam from a fluorine laser can be decreased to generate laser light having a band as narrow as 0.3 pm or less without using an element to provide a narrow band like an etalon.

Since the band of laser light from a fluorine laser is narrowed with the pressure of the laser gas reduced (e.g., reduced to 1 atm), an oscillation beam in the narrowed band is located substantially in the middle of the initial spectral distribution. That is, since no fluctuation of a central wavelength of the oscillation beam with a narrow band occurs as a result of a temperature rise at the band-narrowing element, there is no need for stabilizing means for stabilizing the wavelength. This makes it possible to simplify the laser apparatus.

In the third aspect of the invention, since the pressure of a laser gas is 1 atm or less, it is possible to prevent leakage of fluorine gas (which is a gas harmful to a human body) from a laser chamber.

Further, in the sixth and seventh aspects of the invention, a first oscillator decreases a bandwidth to about 0.3 pm and, even when laser light having low laser power is output, the laser power can be amplified by a second amplifier.

The fourth and fifth aspects of the invention will now be described with reference to FIG. 4.

As shown in FIG. 4, an ultra-narrow band fluorine laser apparatus 200 has a stable type resonator which is a resonator constituted by an output mirror 21 and a totally reflecting mirror 22 containing a laser chamber 23 and employs a longitudinal excitation system in which a pair of electrodes, i.e., a cathode 24 and an anode 25 are arranged in the laser chamber 23 in a direction in parallel with laser light L30, i.e., the direction of the optical axis of the laser light L30. The shaded part indicated by reference number 201 is a discharge area. A laser gas flows in the shaded part in a direction perpendicular to the plane of FIG. 4, and a fan 26 is provided for this purpose.

Since the ultra-narrow band fluorine laser apparatus 200 employs such a longitudinal excitation system, the interval between the cathode 24 and anode 25 is incomparably longer than that in a normal transverse excitation system. For example, while the electrode interval in a normal transverse excitation system is in the range from 10 to 20 mm, the electrode interval can be extended to about 1000 mm in a longitudinal excitation system, which means that the electrode interval can be 50 to 100 times longer than that in the related art.

Therefore, arc discharge is unlikely to occur and glow discharge can be maintained even if the pressure of the laser gas charged in the laser chamber 23 is very low.

As described, in the fourth and fifth aspects of the invention, since longitudinal discharge is used in which discharge occurs in the same direction as the direction of the optical axis of oscillated laser light, a long interval between the cathode and anode, i.e., a long discharge length can be set. As a result, arc discharge is unlikely to occur and glow discharge can be maintained even if the laser gas pressure is decreased.

DETAILED DESCRIPTION OF PREFERRED EMBODIMENTS

A preferred embodiment of the invention will now be described with reference to the accompanying drawings.

Figure 1:
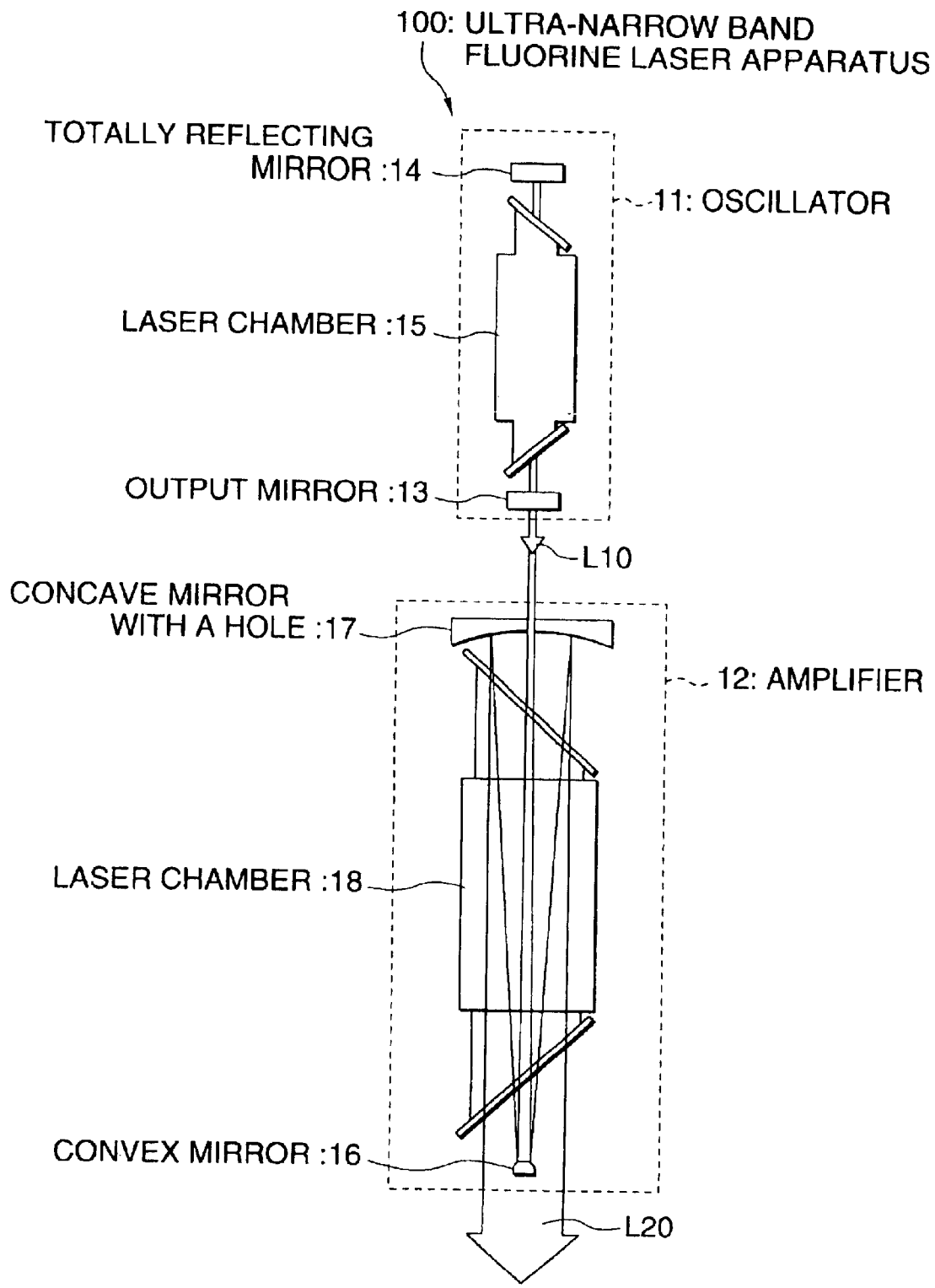
FIG. 1 is an illustration of a configuration of an ultra-narrow band fluorine laser apparatus according to a first embodiment of the invention.
Figure 2:
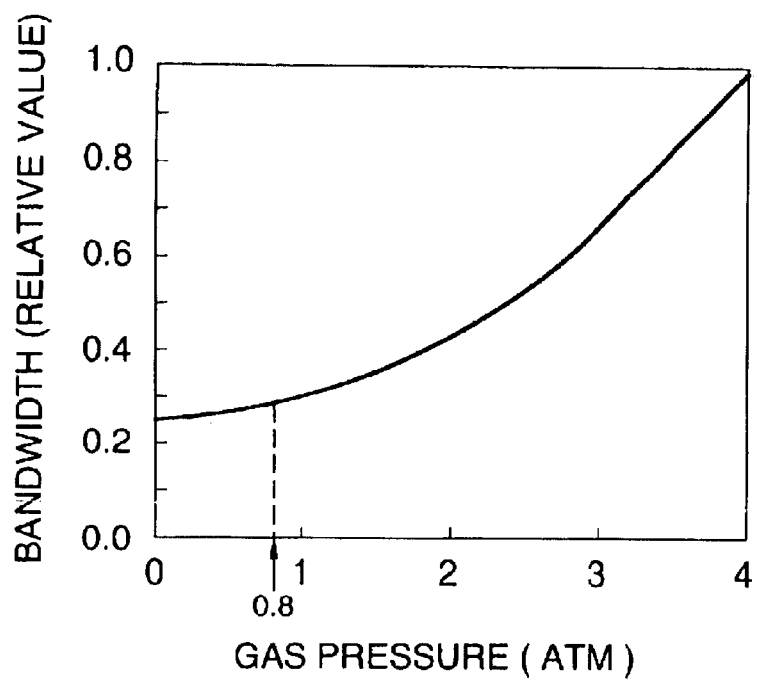
FIG. 2 is a graph showing the dependence of a bandwidth on gas pressures.

FIG. 1 is an illustration of a configuration of an ultra-narrow band fluorine laser apparatus 100 according to the present embodiment, and FIG. 2 is a graph showing the dependence of a bandwidth on gas pressures.

The ultra-narrow band fluorine laser apparatus 100 is adapted to perform a laser operation with the total pressure of a laser gas (hereinafter referred to as "gas pressure") of the fluorine laser set equal to or lower than 1 atm and to generate laser light whose bandwidth is narrowed to 0.3 pm.

Prior to a description on the ultra-narrow band fluorine laser apparatus 100, an explanation will be made on why the bandwidth-can be narrowed to 0.3 pm at a gas pressure of 1 atm or less.

In general, the spectral configuration of a fluorine laser is thought to be the Gaussian type, and a bandwidth $\Delta\lambda$ of the same is expressed by Equation 1.

$$\Delta\lambda = \frac{\sqrt{\ln 2 / \pi}\, \lambda^2}{4\pi \tau_{sp} C \sigma}$$

where ln represents a natural logarithm; $\lambda$ represents a wavelength; $\sigma$ represents an induced emission sectional area; $\tau_{sp}$ represents natural life of emission; and c represents speed of light.

Since the fluorine laser normally operates under a high pressure in the range from 4 to 12 atm, fluorine molecules excited thereby are deactivated by collisions, and a substantial high level life $\tau$ thereof becomes shorter than the natural life of emission $\tau_{sp}$. Therefore, Equation 1 can be approximated by Equation 2 where $\tau_c$ represents the life after collisions.

$$\tau^{-1} \sim \tau_{sp}^{-1} + \tau_c^{-1} \quad \text{Equation 2}$$

A bandwidth $\Delta\lambda(P)$ that reflects a gas pressure P is inversely proportionate to the substantial high level life $\tau$ as expressed by Equation 3.

$$\Delta\lambda(P) \propto \tau^{-1} \quad \text{Equation 3}$$

Further, since it is considered that the inverse of the life $\tau_c$ after collisions (i.e., the speed of deactivation attributable to collisions) is proportionate to the pressure, the bandwidth $\Delta\lambda(P)$ can be expressed by Equation 4 where $\Delta\lambda 0$ represents the bandwidth under a pressure P0.

$$\Delta\lambda(P) = \Delta\lambda_0 \frac{\tau_{sp}^{-1} + \tau_c^{-1} P/P_0}{\tau^{-1}}$$

It is assumed here that $\tau_{sp}$=3.7 ns and $\tau$=1 ns from the disclosure of the above-cited reference 1, and those values are substituted in Equation 4. Further, values of P and P0 that give a value of 0.25 or less when P/P0 is calculated (when the gas pressure P according to the related art is in the range from 4 to 10 atm, the gas pressure P0 is in the range from 0.4 to 1.0 atm) are substituted in Equation 4. As a result of a calculation of Equation 4 with such substitutions, the bandwidth $\Delta\lambda(P)$ that reflects the gas pressure P is decreased to a $\Delta\lambda 0$ value of about 0.3 or less.

Specifically, according to the related art, when the gas pressure is 4 atm, an oscillation beam from the fluorine laser has a bandwidth ($\Delta\lambda 0$) of about 1 pm. Therefore, the bandwidth can be narrowed to about 0.3 pm by decreasing the gas pressure to 1 atm or less.

FIG. 2 shows the relationship between the bandwidth $\Delta\lambda(P)$ and the gas pressure P, i.e., the dependence of the bandwidth $\Delta\lambda(P)$ on gas pressures found by calculating Equation 4 with substitutions of P/P0 values where P0 is fixed at 4 atm and where P is varied to desired barometric pressures in the range from 0 to 4, e.g., 0, 1, 2, 3 and 4.

In the system for causing discharge across the optical axis of laser light in the laser chamber (i.e., in a direction perpendicular to the direction of the optical axis), i.e., the transverse excitation system, since the interval between the cathode and anode is small (e.g., in the range from 10 to 20 mm), the discharge voltage must be decreased when the gas pressure is decreased in order to prevent the occurrence of arc discharge between those electrodes, which results in a reduction of the laser power. For example, when the gas pressure is decreased from 4 atm to 1 atm, a discharge voltage of about 20 KV must be decreased to about 10 KV.

Figure 3:
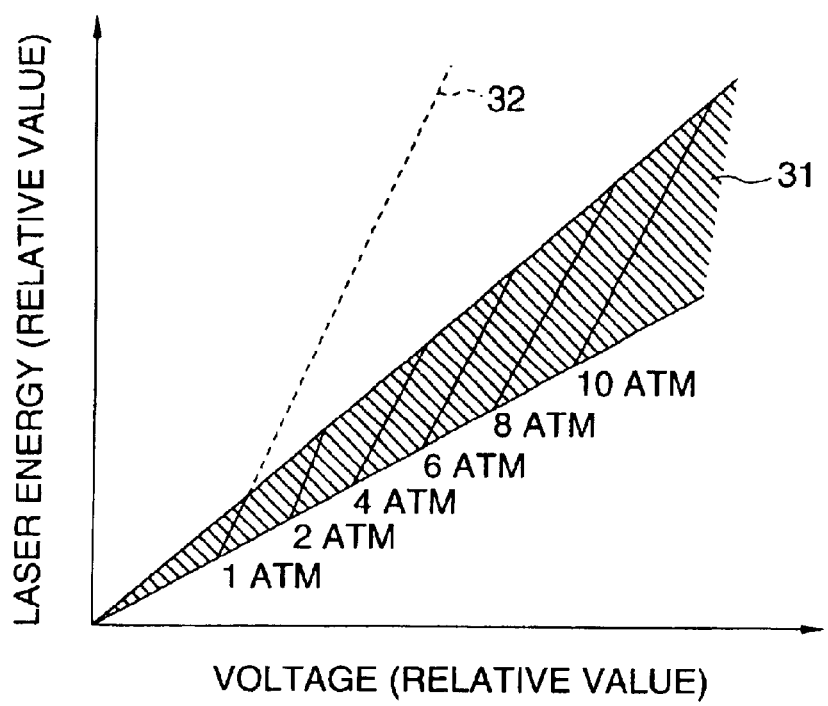
FIG. 3 is a graph showing the dependence of laser power on voltages.

FIG. 3 is a graph showing the dependence of laser power on discharge voltages. In a laser chamber 15 to be described later, as shown in FIG. 3, the laser power increases with the discharge voltage when the gas pressure is constant. When the gas pressure is decreased, the maximum power of laser light decreases at the decreased pressure because the upper limit of the discharge voltage is decreased. That is, in the laser chamber 15, a laser operation occurs within the shaded range indicated by reference number 31 in FIG. 3.

As understood by referring to FIG. 3, when the gas pressure is decreased from 4 atm to 1 atm, the discharge voltage of the laser chamber 15 must be decreased to a degree at which no arc discharge occurs, and this is accomplished by a reduction in the laser power.

In the present embodiment, the ultra-narrow band fluorine laser apparatus 100 is formed by two fluorine laser devices; a laser operation is performed in the first laser device with the gas pressure decreased to 1 atm or less; and the second laser device amplifies the power of laser light whose bandwidth has been narrowed to about 0.3 pm and whose power has been decreased.

The description will continue with reference to FIG. 1 again. An oscillator/amplifier of the ultra-narrow band fluorine laser apparatus 100 is formed by an oscillator 11 and an amplifier 12.

In the oscillator 11, the laser chamber 15 is provided in a stable type resonator constituted by an output mirror 13 and a totally reflecting mirror 14.

The laser chamber 15 is filled with a laser gas including fluorine at about 0.8 atm. As a result, when discharge (glow discharge) is caused between electrodes in the laser chamber 15 to oscillate the laser, laser light L10 having a wavelength of 157.6299 nm and a bandwidth of about 0.3 pm (see FIG. 2) is obtained.

The laser energy of the laser light L10 is as small as 1 mJ or less and is not usable for exposure as it is. The reason is that laser power decreases proportionately to the gas pressure.

In the present embodiment, the power of the laser light L10 is increased using an amplifier 12. In an amplifier 12, a resonator is formed by a concave mirror 17 with a hole and a convex mirror 16, and a laser chamber 18 is provided in the resonator.

The laser light L10 enters through the concave mirror 17 with a hole and is amplified as it travels in the laser chamber 18, and laser light L20 is obtained around the convex mirror 16.

The laser light L20 has increased laser energy of 10 mJ or more, although the bandwidth remains at about 0.3 pm because it has a spectrum similar to that of the laser light L10. The laser light L20 has sufficient energy (laser energy) to use for exposure.

As described above, the bandwidth of the ultra-narrow band fluorine laser apparatus 100 is narrowed to about 0.3 pm by using the fluorine laser oscillator 11 with the gas pressure significantly decreased from a normal value, and a two-stage configuration formed by the oscillator 11 and amplifier 12 is employed to maintain laser power similar to that in the related art.

In the above-described embodiment, a gas such as xenon (Xe) may be added in the laser chamber 15 of the oscillator 11. Since this encourages preliminary ionization, there may be some improvement of the laser power of the oscillator 11.

As described above, the ultra-narrow band fluorine laser apparatus 100 of the present embodiment is capable of generating laser light in a bandwidth as narrow as 0.3 pm or less without using element for achieving a narrow band such as an etalon.

Further, since the narrow band is achieved while decreasing the total pressure of the laser gas, an oscillation beam with a narrow band is located substantially in the middle of the initial spectral distribution. That is, since no fluctuation of a central wavelength of the oscillation beam with a narrow band occurs as a result of a temperature rise at the band-narrowing element, there is no need for stabilizing means for stabilizing the wavelength. This makes it possible to simplify the laser apparatus.

The use of the two fluorine laser devices makes it possible to achieve injection locking wherein the oscillator/amplifier or oscillator serves as a seed laser. As a result, the first fluorine laser device narrows the bandwidth to about 0.3 pm and, even if laser light having low laser power is output, the laser power can be amplified by the second fluorine laser apparatus.

Further, by keeping the total pressure of the laser gas in the laser chamber of the first oscillator (pr seed laser) at 1 atm or less, it is possible to prevent leakage of fluorine gas (which is a gas harmful to a human body) from the laser chamber, thereby improving safety.

A second embodiment of the invention will now be described.

Figure 4:
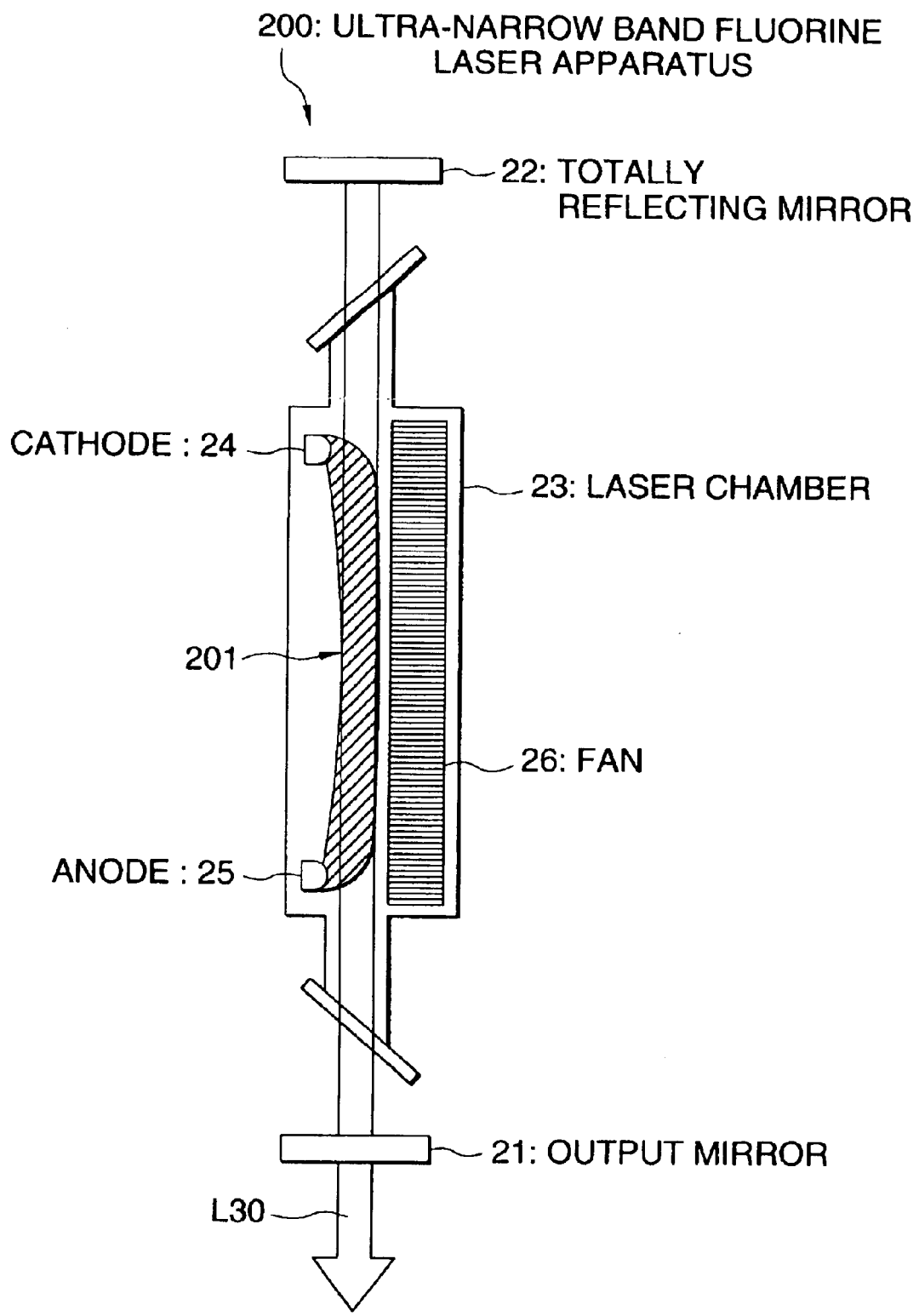
FIG. 4 is an illustration of a configuration of an ultra-narrow band fluorine laser apparatus according to a second embodiment of the invention.

FIG. 4 is an illustration of a configuration of an ultra-narrow band fluorine laser apparatus 200 according to a second embodiment of the invention.

The second embodiment is the same as the first embodiment in that a fluorine laser is operated with the total pressure (hereinafter referred to as "gas pressure") of the laser gas kept at 1 atm or less to generate laser light with a bandwidth narrowed to about 0.3 pm.

The present embodiment employs the longitudinal excitation system to be detailed later unlike the first embodiment which employs the transverse excitation system. By employing the longitudinal excitation system, a long interval is set between the cathode and anode in the laser chamber without decreasing the discharge voltage to be applied between the electrodes when the gas pressure is decreased, thereby suppressing the occurrence of arc discharge between those electrodes.

As shown in FIG. 4, the ultra-narrow band fluorine laser apparatus 200 has a stable resonator which is a resonator constituted by an output mirror 21 and a totally reflecting mirror 22 containing a laser chamber 23. The laser apparatus has the same configuration as that of the oscillator 11 of the ultra-narrow band fluorine laser apparatus 100 shown in FIG. 1.

However, the longitudinal excitation system is employed in which a pair of electrodes, i.e., a cathode 24 and an anode 25 are arranged in the laser chamber 23 in a direction in parallel with laser light L30, i.e., the direction of the optical axis of the laser light L30. The shaded part indicated by reference number 201 is a discharge area. The laser gas flows in the shaded part in a direction perpendicular to the plane of FIG. 4, and a fan 26 is provided for this purpose.

Since the ultra-narrow band fluorine laser apparatus 200 employs such a longitudinal excitation system, the interval between the cathode 24 and anode 25 is incomparably longer than that in a normal transverse excitation system. For example, while the electrode interval in a normal transverse excitation system is in the range from 10 to 20 mm, the electrode interval can be extended to about 1000 mm in the longitudinal excitation system of the present embodiment, which means that the electrode interval can be 50 to 100 times longer than that in the related art.

Therefore, arc discharge is unlikely to occur and glow discharge can be maintained even if the pressure of the laser gas charged in the laser chamber 23 is very low. As a result, the output mirror 21 emits laser light L30 which has a wavelength of 157.6299 nm and whose oscillation beam bandwidth is as narrow as about 0.3 pm.

Since the electrode interval in the transverse excitation system is as small as the beam height of laser light (e.g., in the range from about 10 to 20 mm) as described above, the discharge voltage must be low (e.g., 10 KV) when the gas pressure is decreased to 1 atm in order to prevent the occurrence of arc discharge at the electrode interval, and this results in reduced laser energy (e.g., 1 mJ).

On the contrary, in the longitudinal system, arc discharge is unlikely to occur because a long electrode interval (e.g., on the order of 1000 mm) can be set. That is, since discharge can be caused at a high discharge voltage (e.g., 20 KV), for example, glow discharge continues instead of changing to arc discharge even if the discharge voltage is increased as apparent from the characteristic represented by dotted line indicated by reference number 32 in FIG. 3 when the gas pressure is, for example, 1 atm. Therefore, the laser power can be increased.

The ultra-narrow band fluorine laser apparatus 200 can be used in substitution for the oscillator 11 of the ultra-narrow band fluorine laser apparatus 100 shown in FIG. 1. In this case, since the laser power of laser light from the oscillator 11 can be increased, the amplifying characteristics of the amplifier 12 is also improved.

In summary, either the transverse excitation system or the longitudinal excitation system may be used for the oscillator 11 of the ultra-narrow band fluorine laser apparatus 100 shown in FIG. 1.

As described above, the second embodiment provides the same effects as the first embodiment in that laser light in a bandwidth as narrow as 0.3 pm or less can be generated from the ultra-narrow band fluorine laser apparatus 200 without using a band-narrowing element such as an etalon. Since the narrow band is achieved with the total pressure of the laser gas decreased, no fluctuation of a central wavelength of the oscillation beam with the narrow band occurs as a result of a temperature rise at the band-narrowing element, and the central wavelength is located substantially in the middle of the initial spectral distribution. This eliminates the need for stabilizing means for stabilizing the wavelength, thereby allowing the laser apparatus to be simplified.

Further, in the second embodiment, the electrode interval can be set at a length such that no arc discharge is caused (i.e., a long discharge length can be set) even if the gas pressure is sufficiently decreased because the longitudinal discharge (longitudinal excitation system) is used in which discharge occurs in the same direction as the direction of the optical axis of oscillated laser light. This makes it possible to maintain glow discharge which causes laser oscillation.

A third embodiment of the invention will now be described.

Figure 5:
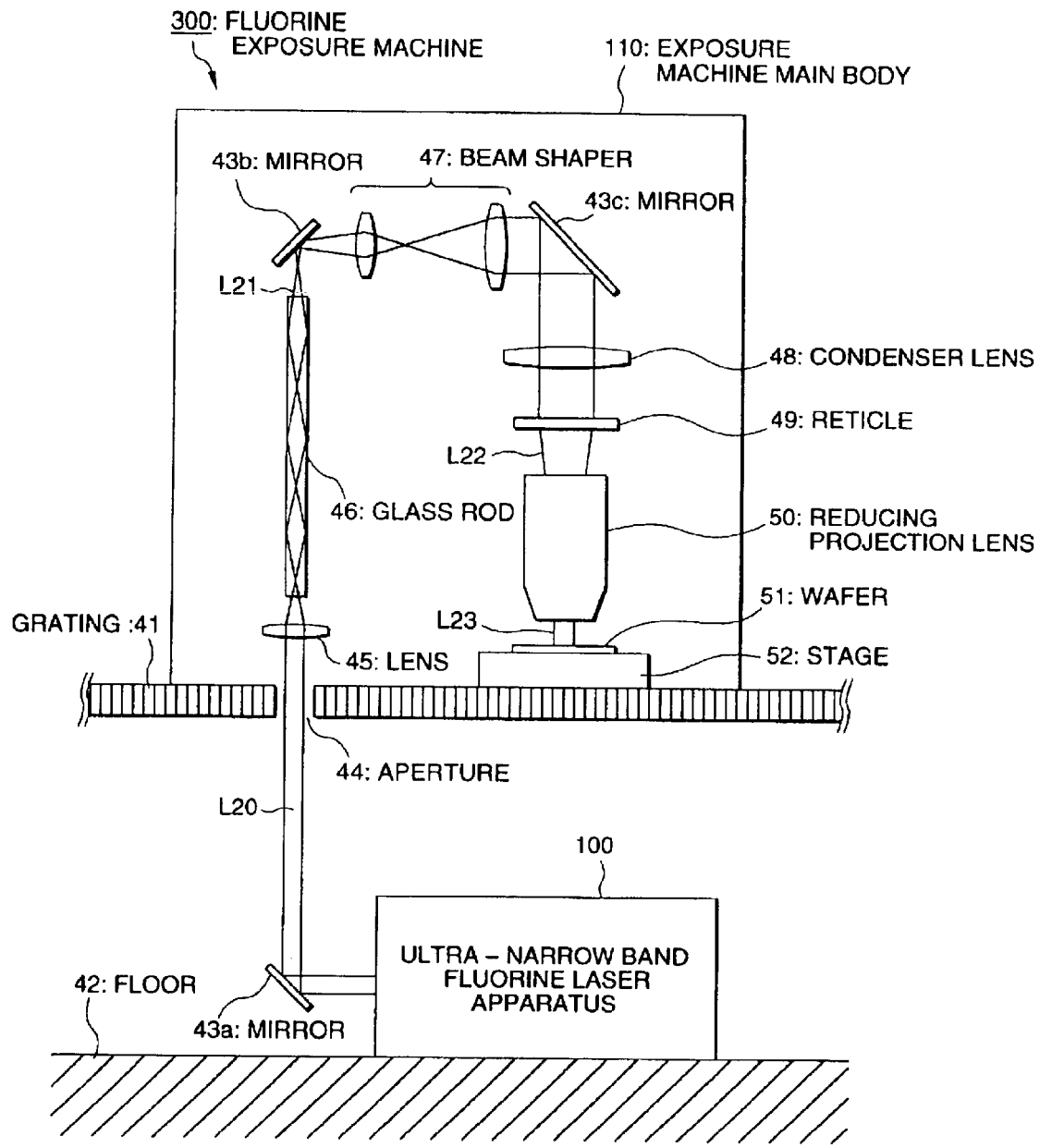
FIG. 5 is an illustration of a configuration of a fluorine exposure tool according to a third embodiment of the invention.

FIG. 5 is an illustration of a configuration of a fluorine exposure tool 300 utilizing an ultra-narrow band fluorine laser apparatus.

The fluorine exposure tool 300 is generally constituted by an ultra-narrow band fluorine laser apparatus 100 as shown in FIG. 1 and an exposure tool main body 110.

The exposure tool main body 110 is provided on a grating 41 in a clean room, and the ultra-narrow band fluorine laser apparatus 100 is provided on a floor 42 (a floor generally referred to as "under floor") under the grating 41.

Laser light L20 having only intense lines (oscillation beams) in a bandwidth of about 0.3 pm provided by the ultra-narrow band fluorine laser apparatus 100 travels upward after being reflected by a mirror 43*a*, passes through an aperture 44 of the grating 41 and enters the exposure tool main body 110.

The laser light L20 travels in a glass rod 46 made of calcium fluoride after being converged by a lens 45. The light is subjected repeatedly total reflection in the rod and is emitted as laser light L21 having a uniform beam intensity distribution.

The laser light L21 is reflected by a mirror 43*b*, passed through a beam shaper 47 which expands the beam cross section, reflected further by a mirror 43*c* and passed through a condenser lens 48 to be projected upon a reticle 49.

After exiting the reticle 49, the laser light L22 passes through a reducing projection lens 50 to impinge upon a wafer 51. That is, a pattern in the reticle 49 is transferred by the reducing projection lens 50 on to the wafer 51 to cause exposure in the configuration of the pattern in reticle 49. The wafer 51 is placed on a stage 52.

The fluorine exposure tool 300 of the third embodiment uses the reducing projection lens 50 as a reducing projection optical system, and the reducing projection lens 50 is constituted by a monochrome lens made of calcium fluoride.

A reducing projection optical system constituted only by a lens can be used as described above because the laser light L20 provided by the ultra-narrow band fluorine laser apparatus 100 has a bandwidth of about 0.3 pm which is a small fraction of that of a fluorine laser according to the related art and the chromatic aberration of the reducing projection lens 50 is negligible.

Therefore, the exposure main body 110 has a configuration similar to that of a KrF exposure tool according to the related art. Since the only significant difference is the change of the lens material from quartz to calcium fluoride, the reducing projection lens can be designed similarly to that in the related art, which makes it possible to reduce costs significantly.

As described above, the fluorine exposure tool of the third embodiment of the invention can employ a totally refractive reducing projection optical system without any significant increase in the cost of the fluorine laser apparatus (ultra-narrow band fluorine laser apparatus) and without any significant reduction in the efficiency of the laser.

That is, the reducing projection optical system can be designed similarly to that of a KrF exposure tool according to the related art. Therefore, a simulation tool similar to those in the related art can be used to allow the reducing projection optical system to be designed in a short period and to allow a significant reduction in labor cost. This makes it possible to merchandize a fluorine exposure tool in a short period at a low cost.

What is claimed is:

1. An ultra-narrow band fluorine laser apparatus comprising a laser chamber which is filled with a laser gas including fluorine and to which a predetermined discharge voltage is applied between a cathode and an anode thereof for causing a fluorine laser to oscillate laser light to be supplied as an exposure light source of an exposure apparatus, wherein the ultra-narrow band fluorine laser apparatus is operated to narrow a bandwidth of laser light oscillated by said laser chamber to a desired value by maintaining total pressure of said laser gas equal to or lower than 2.8 atm.

2. The ultra-narrow band fluorine laser apparatus according to claim 1, wherein the interval between the cathode and anode is set at a predetermined length to maintain glow discharge without causing dielectric breakdown between said cathode and anode when total pressure of said laser gas is maintained equal to or lower than 2.8 atm.

3. The ultra-narrow band fluorine laser apparatus according to claim 1, wherein a discharge mode for causing said glow discharge is longitudinal discharge in which discharge occurs in the same direction as an optical axis of laser light oscillated in said laser chamber.

4. The ultra-narrow band fluorine laser apparatus according to claim 1, further comprising an oscillator including said laser chamber and an amplifier for amplifying power of laser light oscillated by the oscillator and supplying it as an exposure light source for said exposure apparatus.

5. The ultra-narrow band fluorine laser apparatus according to claim 4, wherein a discharging mode of the glow discharge caused between the cathode and anode in said laser chamber is transverse discharge in which discharge occurs in a direction perpendicular to an optical axis of laser light oscillated in said laser chamber and wherein the transverse discharge decreases the discharge voltage applied between said cathode and anode to a desired voltage such that glow discharge is maintained without causing dielectric breakdown between the cathode and anode.

6. The ultra-narrow band fluorine laser apparatus according to claim 1, wherein the ultra-narrow band fluorine laser apparatus is operated to narrow the bandwidth of laser light to about 0.2 to 0.3 pm.

7. An ultra-narrow band fluorine laser apparatus comprising a laser chamber which is filled with a laser gas including fluorine and to which a predetermined discharge voltage is applied between a cathode and an anode thereof for causing a fluorine laser to oscillate laser light to be supplied as an exposure light source of an exposure apparatus, wherein the ultra-narrow band fluorine laser apparatus is operated to narrow a bandwidth of laser light oscillated by said laser chamber to a desired value without use of an optical element for further narrowing said bandwidth of laser light by maintaining total pressure of said laser gas equal to or lower than 2.8 atm.

8. The ultra-narrow band fluorine laser apparatus according to claim 7, wherein said total pressure of said laser gas is maintained equal to or lower than 1 atm and the bandwidth is narrowed to a desired value not exceeding 0.6 pm.

9. The ultra-narrow band fluorine laser apparatus according to claim 7, wherein the ultra-narrow band fluorine laser apparatus is operated to narrow the bandwidth of laser light to about 0.2 to 0.3 pm.

* * * * *